United States Patent
Willems et al.

(10) Patent No.: US 7,733,598 B1
(45) Date of Patent: Jun. 8, 2010

(54) TAPE CARTRIDGE AND TAPE DRIVE SYSTEM WITH INTERNAL AND EXTERNAL TAPE GUIDES

(75) Inventors: John D. Willems, Arvada, CO (US); Kathryn L. Baker, Lafayette, CO (US)

(73) Assignee: Oracle America, Inc., Redwood Shores, CA (US)

( * ) Notice: Subject to any disclaimer, the term of this patent is extended or adjusted under 35 U.S.C. 154(b) by 580 days.

(21) Appl. No.: 11/409,862

(22) Filed: Apr. 24, 2006

(51) Int. Cl.
    *G11B 15/60* (2006.01)
(52) U.S. Cl. .................. 360/96.1; 360/93; 360/130.21; 360/130.31; 360/132
(58) Field of Classification Search .............. 360/130.3, 360/130.31, 130.32, 130.33, 132, 93, 96.1, 360/96.3, 130.21
See application file for complete search history.

(56) References Cited

U.S. PATENT DOCUMENTS

| | | | |
|---|---|---|---|
| 3,692,255 A * | 9/1972 | Von Behren | 242/343.2 |
| 4,722,488 A * | 2/1988 | Kubo | 242/532.1 |
| 5,214,547 A * | 5/1993 | Kondo | 360/94 |
| 5,649,672 A * | 7/1997 | Wolff et al. | 242/334 |
| 5,760,994 A * | 6/1998 | Kimura | 360/85 |
| 5,927,641 A * | 7/1999 | Perego | 242/532.1 |
| 6,754,033 B1 * | 6/2004 | Argumedo et al. | 360/77.12 |
| 2005/0093959 A1 * | 5/2005 | Kitamura | 347/222 |

OTHER PUBLICATIONS

StorageTek Tape Storage, www.storagetek.com, p. 1.
StorageTek Tape Drives, www.storagetek.com, p. 1.
StorageTek T9840 Tape Drives, www.storagetek.com, p. 1-4.

* cited by examiner

*Primary Examiner*—Jefferson Evans
(74) *Attorney, Agent, or Firm*—Brooks Kushman P.C.

(57) ABSTRACT

A data storage tape cartridge and tape drive is disclosed in which drive mounted guides are received in a cutout of a data storage cartridge. A read/write head is moved through an access opening into engagement with a data storage tape between the drive mounted guides. The drive mounted guides closely control lateral positioning of the tape as it passes across the read/write head. The read/write head and the drive mounted guides are moved relative to each other and into engagement with the tape.

20 Claims, 4 Drawing Sheets

TAPE CARTRIDGE AND TAPE DRIVE SYSTEM WITH INTERNAL AND EXTERNAL TAPE GUIDES

BACKGROUND OF THE INVENTION

1. Field of the Invention

The present invention relates to tape drive systems and data storage tape cartridges.

2. Background Art

Data storage tape drives and data storage tape cartridges are generally available in two types. In one type, tape guides are provided internal to the tape cartridge for guiding the tape along a defined tape path. A second type of tape drive has tape guides that are provided within the drive that are external to the cartridge.

Internal tape guides tend to be subject to lateral tape motion that may limit tape storage capacity. Lateral tape motion is one part of an overall drive and tape cartridge system tolerance stack-up. The mechanical system stack-up is combined with system responses and corrections, such as the responsiveness of the actuator, the ability of the heads to read partial tracks, lateral tape movement, amplitude and frequency relative to tape speed, and the like, that determine the full track mis-registration budget. Track mis-registration budgets accommodate a limited degree of tape mis-registration by allowing for additional space between adjacent tracks on a tape. Track mis-registration budgets are determined based upon full tape drive and tape cartridge tolerance stack-up. Tape speed and actuator performance characteristics also impact track mis-registration budgets. As the track mis-registration budget for a tape drive system increases, less data may be stored on each tape cartridge which reduces storage efficiency. Problems with lateral tape motion are inherent in all internally guided tape cartridges.

Servo off tracks are a result of the read/write head not being able to follow lateral tape movement adequately. Servo elements follow a pattern written on the tape that are provided next to the read/write elements. When the actuator cannot keep up with the lateral tape movement of the tape, the servo elements read off of the servo pattern written on the tape which results in a servo off track.

Externally guided tape cartridges generally require threading the tape through the external tape guides. External tape guides provided within the tape drive allow closer tolerances to be held and allow for greatly reduced track mis-registration budgets. Problems associated with externally guided tape drive systems include difficulty in threading the tape through the system, exposure of the tape when it is external to the cartridge to foreign matter, and possible damage to the tape when it is guided outside of the tape cartridge. In addition, the time required to thread the tape is too long to be competitive in the fast access drive/cartridge market.

Fast access tape cartridges may be presented to a tape drive system with one half of the tape on each of two tape reels. Access is faster because less than half of the tape must be reviewed to locate the desired data. Access can also be faster with internally guided tape cartridges because it is not required to thread the tape. For example, the time to data may be as low as four seconds with a cartridge, while a drive guided system may require ten seconds just for threading the tape. There is a need for fast access tape drive systems that can provide more tape path options. In fast access tape drive systems the use of thinner media and more stringent tape path requirements are difficult to achieve with current internally guide data storage tape cartridges. Externally guided tape systems cannot use this approach for providing fast access to data.

There is a need to extend the life of current tape drive systems to allow them to store more data more efficiently. It would be advantageous to increase the storage capacity of current and future data storage cartridges by improving tape registration. To the extent that lateral motion can be more closely controlled, additional data may be written to data tape storage cartridges.

These and other problems are addressed by applicant's invention as summarized below.

SUMMARY OF THE INVENTION

The invention is directed to providing a tape storage system that combines the use of tape guides that are internal to the cartridge with tape guides within the drive that are external to the cartridge.

According to one aspect of the present invention a tape system is provided that includes a tape drive and a tape cartridge with the read/write head of the tape drive being moved relative to a drive mounted tape guide on the opposite side of the tape from the head. The read/write head is disposed on a tape deck and the drive mounted tape guide is also provided on the tape deck. The tape deck also includes two tape reel spindles that engages two tape reels in the tape cartridge. Tape is wound around the tape reels and a plurality of cartridge tape guides are provided inside the cartridge for guiding the tape internal to the cartridge. The tape cartridge is loaded into the tape drive system with the tape being inserted between the read/write head and the drive mounted tape guide. The read/write head engages the tape on a first side with the drive mounted tape guide engaging the tape on a second side.

According to other aspects of the invention as they relate to the tape system, the read/write head is attached to a slide that moves the read/write head in a plane toward and away from the drive mounted tape guide. A supply reel and a take up reel may be provided in the cartridge and two tape reel spindles may be provided that engage the two tape reels. The read/write head and the drive mounted tape guide are held in alignment with one another with the drive mounted tape guide controlling the lateral positioning of the tape relative to the read/write head.

According to another aspect of the present invention, a tape cartridge is provided for a tape drive that has a read/write head disposed on a tape deck. At least two drive mounted tape guides are disposed on the tape deck and two tape reel spindles are driven by the drive. The tape cartridge comprises two tape reels that are received on two spindles of the drive with a web of tape being wound on the tape reels. A plurality of internal guides are mounted inside the cartridge for guiding the tape internal to the cartridge. The cartridge includes a housing having an access opening through which the read/write head of the tape drive accesses the tape. The housing has a cutout portion through which the drive mounted tape guides are received. The tape cartridge is loaded into the tape drive system with the tape being inserted between the read/write head and the two drive mounted tape guides. The read/write head is moved relative to the at least two drive mounted tape guides so that the tape is engaged on a first side by the read/write head and is engaged on the second side by the two drive mounted tape guides.

According to other aspects of the invention as they relate to the tape cartridge, the access opening and the cutout portion may be combined on the housing. The access opening may open through a side wall of the housing with the cutout portion opening through a base wall of the housing. A supply reel and a take up reel may be provided in the tape cartridge that are oriented to be received on two tape reel spindles of the tape drive. Two of the tape guides mounted on the cartridge may be disposed on opposite lateral sides of the access opening to retain a length of tape across the access opening. The drive mounted tape guides may be received in the housing between the read/write head and the tape guides mounted on the cartridge. The read/write head may shift a segment of the tape to a recessed position relative to a plane defined by the drive mounted tape guides.

According to another aspect of the present invention, a tape drive is provided for a tape cartridge having a housing with an access area, a pair of tape reels and a web of tape wound on the tape reels. A plurality of cartridge tape guides mounted inside the cartridge guide the tape. The tape drive comprises a tape deck on which the tape cartridge may be placed. A pair of spindles extend from the tape deck and are inserted into the tape reels for rotating the reels. At least two drive mounted tape guides extend from the tape deck for guiding the tape. A read/write head extends from the tape deck for writing data and reading data from the tape. The drive mounted tape guides are received in the housing of the cartridge behind the tape with the read/write head being received in the housing in the cartridge in front of the tape. The read/write head and drive mounted tape guides are moved relative to each other by the tape drive to trap the tape between the read/write head and the drive mounted tape guides.

According to other aspects of the invention as they relate to the tape drive, the tape reels may comprise a supply reel and a take up reel that are engaged by tape reel spindles of the tape drive. Two tape guides are provided in the cartridge and are disposed on opposite lateral sides of the access area to retain a length of tape across the access opening. The drive mounted tape guides are received in the housing between the read/write head and the tape guides mounted inside the cartridge. Read/write head may shift a segment of tape to a recessed position relative to a plane defined by the drive mounted tape guides.

These and other aspects of the present invention will be better understood in view of the attached drawings and the following detailed description of the illustrated embodiments of the invention.

DETAILED DESCRIPTION OF THE PREFERRED EMBODIMENT(S)

Figure 1:
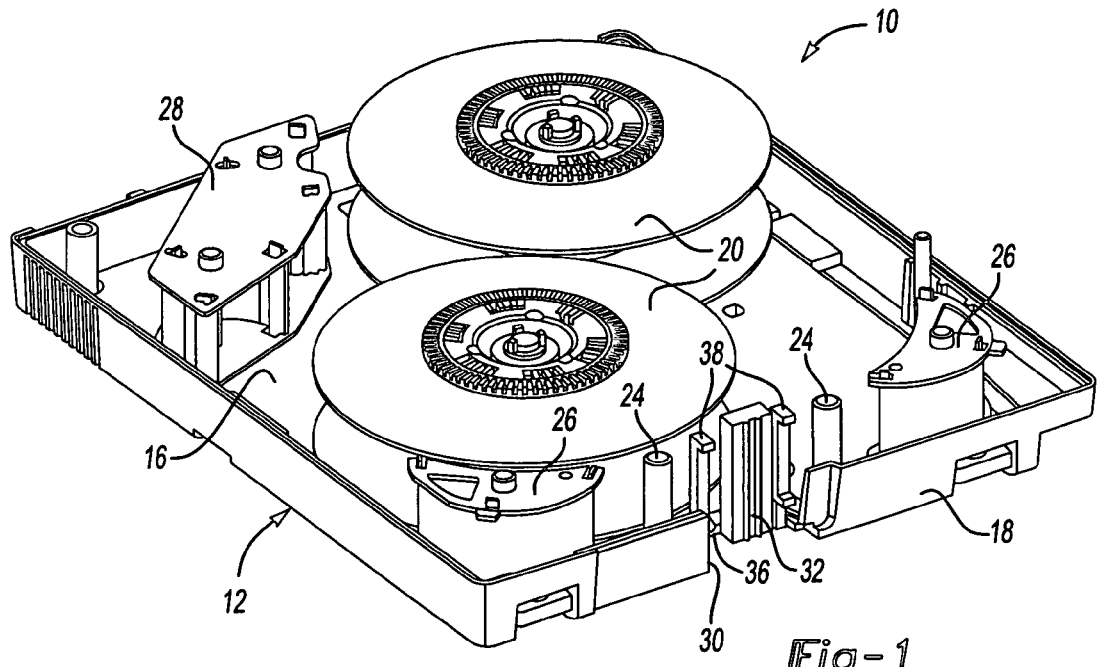
FIG. 1 is a perspective view of a tape cartridge with the top portion removed and also showing a read/write head and drive mounted tape guides received within the cartridge.
Figure 2:
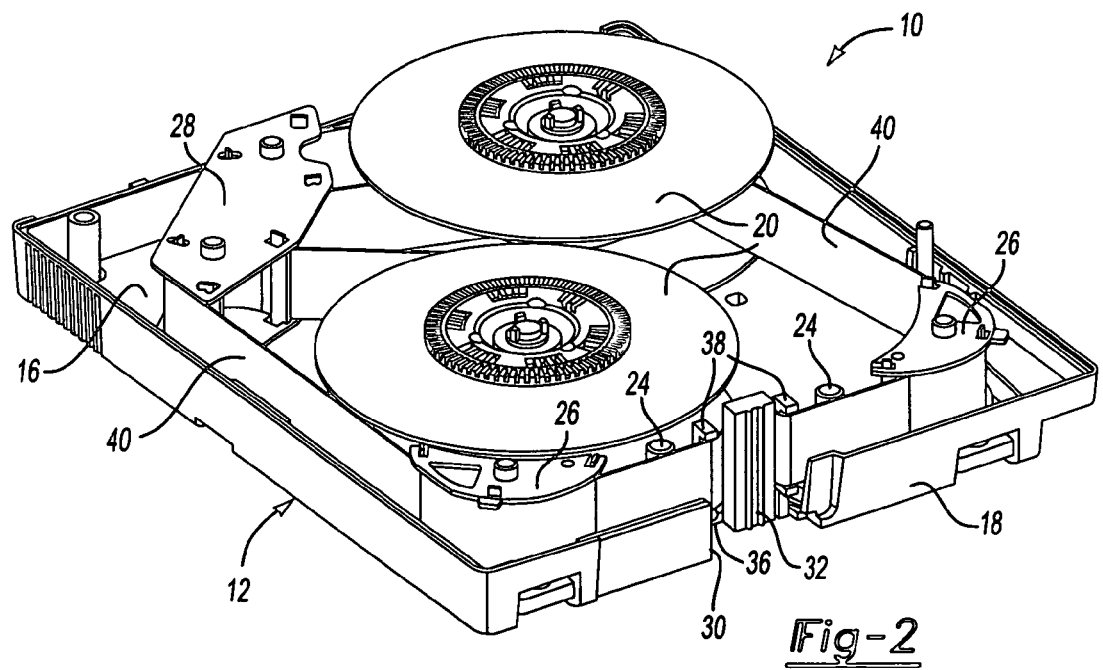
FIG. 2 is a view similar to FIG. 1 but showing the tape inside the cartridge.

Referring to FIGS. 1 and 2, a data storage tape cartridge generally indicated by reference numeral 10 is shown to include a housing generally indicated by reference numeral 12. The housing, as shown in FIGS. 1 and 2, includes only the bottom half of the cartridge with the upper half of the cartridge having been removed to show the internal cartridge components. The housing 12 includes a base wall 16 and side walls 18 that extend around the periphery of the base wall 16. Two tape reels 20 are assembled inside the cartridge 10. A plurality of internal tape guides 24 are attached to the base wall 16. The guides 24 may be fixed guides, but could alternatively be roller guides. Specialized corner guides 26 may be provided to guide the tape around corners of the cartridge 10. A guide block 28 may also be provided in the cartridge and may include tape tensioners (not shown). An access opening 30 is provided in one of the side walls 18 which may also be referred to as the front wall of the cartridge. A read/write head 32 of a tape drive (not shown) is illustrated as being inserted inside the access opening 30. A cutout 36 is provided in base wall 16. The access opening 30 and cutout 36 may open into each other. Drive mounted guides 38 are received in the cutout 36 and are designed to cooperate with the read/write head 32.

Referring specifically to FIG. 2, a tape 40 is shown following a tape path within the cartridge. The tape 40 is routed around the internal tape guides 24, corner guides 26 and guide block 28 as the tape passes from one tape reel 20 to the other.

Figure 3:
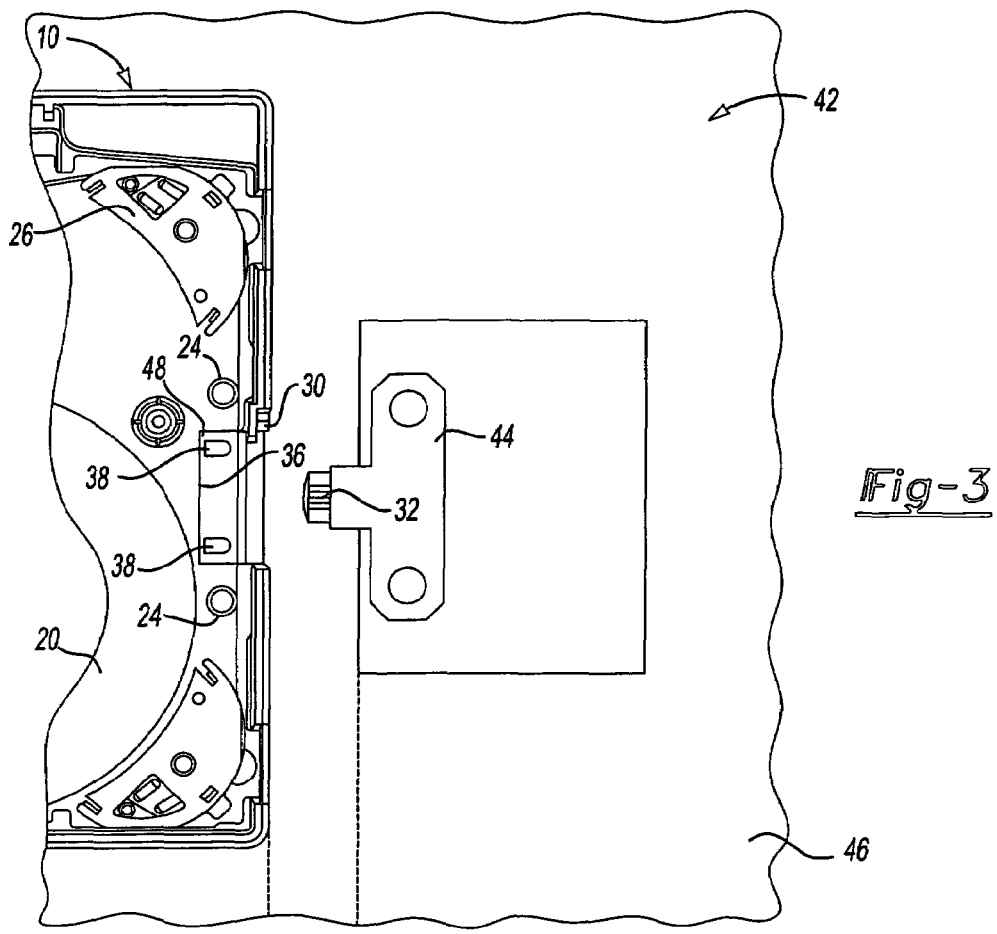
FIG. 3 is a fragmentary top plan view of a tape drive and tape cartridge showing the drive mounted tape guide and read/write head prior to engagement with the tape.
Figure 4:
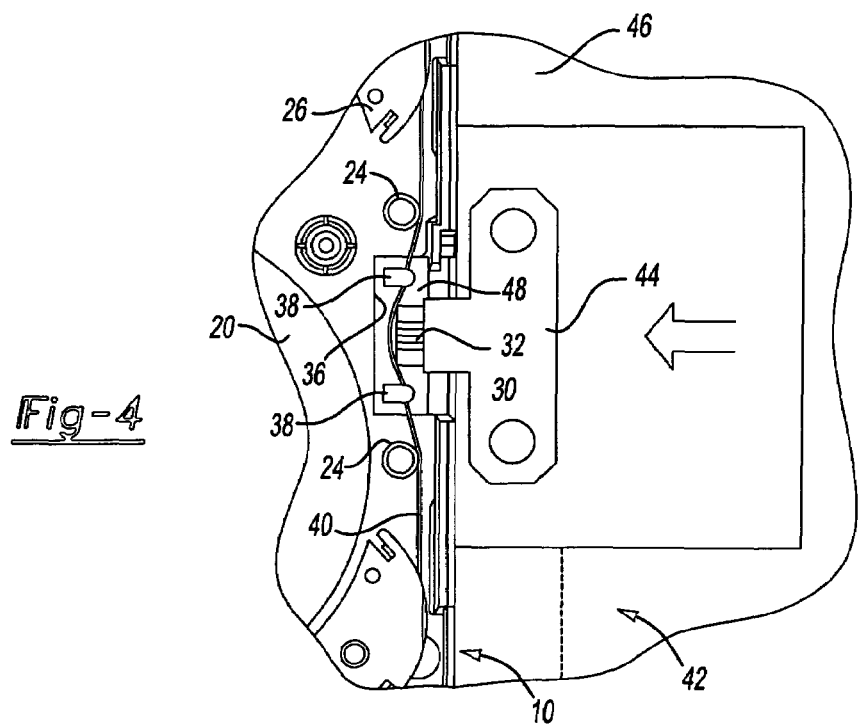
FIG. 4 is a fragmentary top plan view of the tape drive and tape cartridge with the read/write head and drive mounted tape guide engaging the tape.
Figure 5:
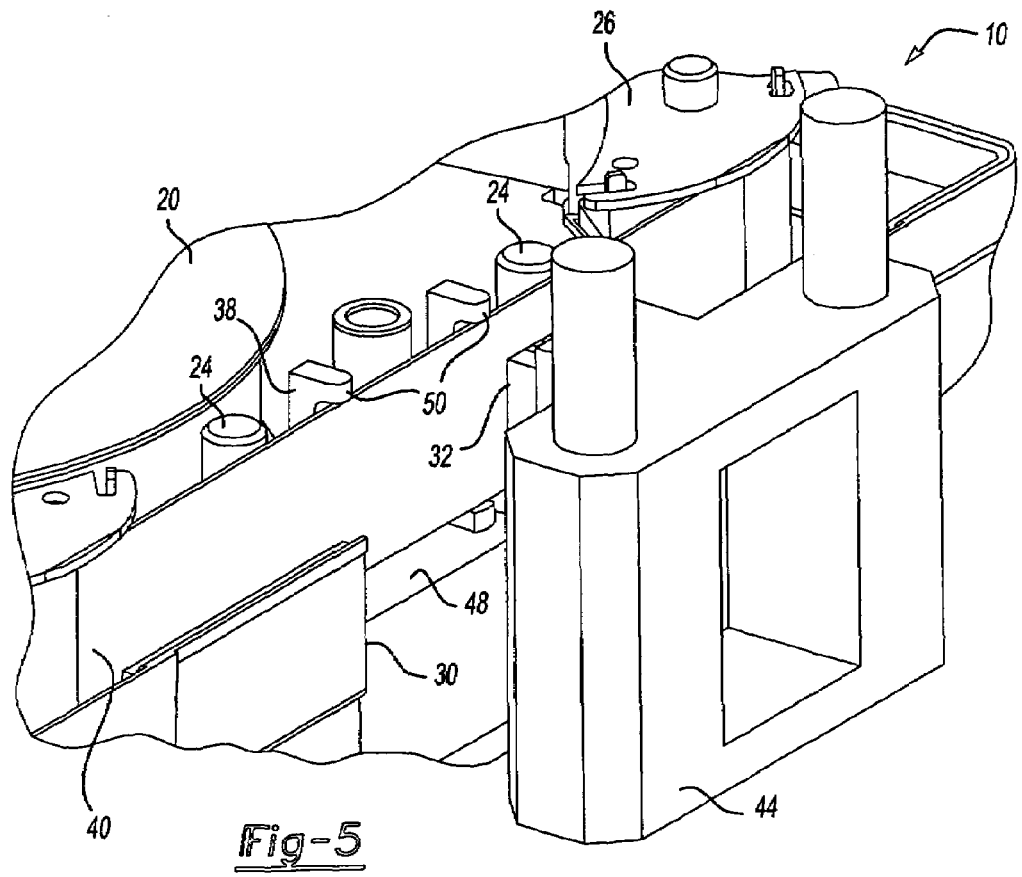
FIG. 5 is a fragmentary perspective view of a tape cartridge and tape drive with the drive mounted tape guides engaging the tape and the read/write head in position prior to engaging the tape.

Referring to FIGS. 3-5, a data storage tape cartridge 10 is shown that includes a partial depiction of a tape reel 20. Also illustrated in FIG. 3 are internal tape guides 24 and corner guides 26 that guide the tape 40 across the access opening 30. A tape drive 42 is partially shown to include a head slide assembly 44 that supports the read/write head 32. The head slide assembly 44 is movable toward and away from cartridge 10. The tape guide assembly 44 is provided on the tape deck 46 of the tape drive 42. The tape deck 46 is the portion of the tape drive on which the tape cartridges 10 are placed to be read by the read/write head 32.

Drive mounted guides 38 are mounted on a drive guide support assembly 48 that holds the drive mounted guides 38 behind the tape 40 on the opposite side of the tape 40 from the read/write head 32. The drive mounted guides 38 each include a top flange 50 which are best seen in FIG. 5.

Referring to FIG. 4, the head slide assembly 44 is shown in its read/write position wherein it engages the tape 40 between the drive mounted guides 38. The head slide assembly 44 moves in a sliding or in another type of motion, such as a pivoting motion, toward the drive mounted guides 38 that are supported on the drive guide support assembly 48. The directional arrow in FIG. 4 indicates the direction of movement of head slide assembly 44 when it is moved into its read/write position. The read/write head 32 engages the tape 40 between drive mounted guides 38 and forms a recessed portion 52 of the tape. This pinching action between the read/write head 32 and the drive mounted guides 38 confines the tape 40 better than if only internal guides, like guide rollers 24, are provided to back the tape 40. This serves to reduce lateral tape motion and improve data storage efficiency. As the tape moves from one reel 20 to the other, it follows the internal tape guides, such as the corner rollers 26 and the internal guide rollers 24 within the cartridge. However, as the tape moves across the access opening 30, the tape is guided by drive mounted guides 38 that are retained in a closely controlled relationship relative to the read/write head 32.

Referring to FIG. 5, a portion of the cartridge and the read/write head and head slide assembly 44 are shown in greater detail. The head slide assembly 44 is shown in its retracted position with the read/write head 32 spaced from the tape 40. The drive mounted guides 38 include top flange 50 and a bottom flange 54. The tape 40 is laterally captured between the top flange 50 and the bottom flange 54 which function to locate the tape relative to the read/write head 32. The drive mounted guides 38 are mounted on the drive guide support assembly 48. While in the illustrated embodiment the read/write head 32 is moved toward the drive mounted guides 38, it is also possible that the cartridge and the drive mounted guides 38 may be movable toward the read/write head 32. Either movement of the guide toward the read/write head or read/write head 32 toward the guides 38 is generally referred to as relative movement between the respective parts. The internal tape guides 24 hold the tape 40 in position so that drive mounted guides 38 may be moved through the cutout 36 and behind tape 40.

Figure 6:
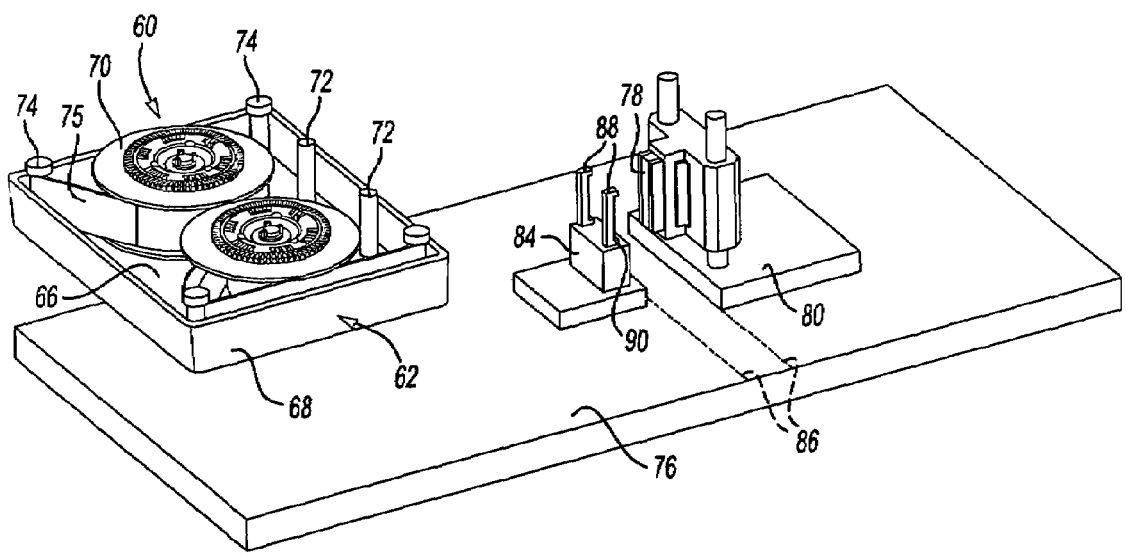
FIG. 6 is a diagrammatic perspective view of a tape drive and of an alternative embodiment of a tape cartridge prior to loading the cartridge into the tape drive.

Referring to FIG. 6, an alternative embodiment of a data storage tape cartridge 60 is shown to include a housing 62 that encloses the tape 40. It should be noted that the upper portion of the housing has been removed from the view in FIG. 6 to permit observation of the internal components thereof. Housing 62 includes a base wall 66 and side walls 68 that extend around the periphery of the base wall 66. Two tape reels 70 are shown disposed within the cartridge 60 that retain a tape 75. Internal tape guide pins 72 are provided inside the cartridge along with corner rollers 74.

A tape deck 76 is also shown in FIG. 6 on which the tape cartridge 60 is received for reading and writing. A read/write head 78 is mounted on the tape deck 76 by a slide assembly 80. Drive guides 82 are supported on a drive guide pedestal 84. The slide assembly 80 and drive guide pedestal 84 are initially positioned in a spaced relationship relative to each other that is indicated by initial spacing lines 86. When the cartridge 60 is loaded onto the tape deck 76, the slide assembly 80 is spaced from the drive guide pedestal 84 as indicated. After loading the tape cartridge 60 onto the tape deck 76, the drive guides 82 are received behind the tape 75 and the read/write head 78 is moved into engagement with the tape 75 by the slide assembly 80.

As shown in FIG. 6, the drive guides 82 include a top flange 88 and a bottom flange 90 that function to retain the tape 75 in a desired position relative to the read/write head 78. Top flange 88 and bottom flange 90 reduce lateral tape motion.

Figure 7:
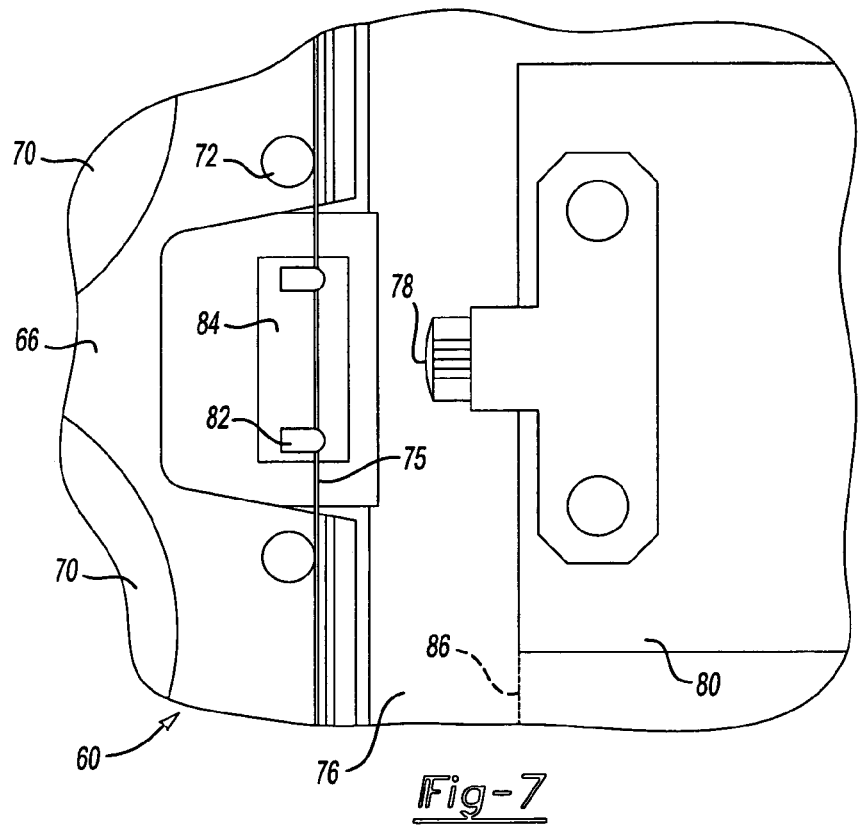
FIG. 7 is a fragmentary top plan view of the cartridge tape and tape drive embodiment of FIG. 6 showing the drive mounted tape guides engaging the back of the tape with the read/write head shown in position prior to engaging the tape.
Figure 8:
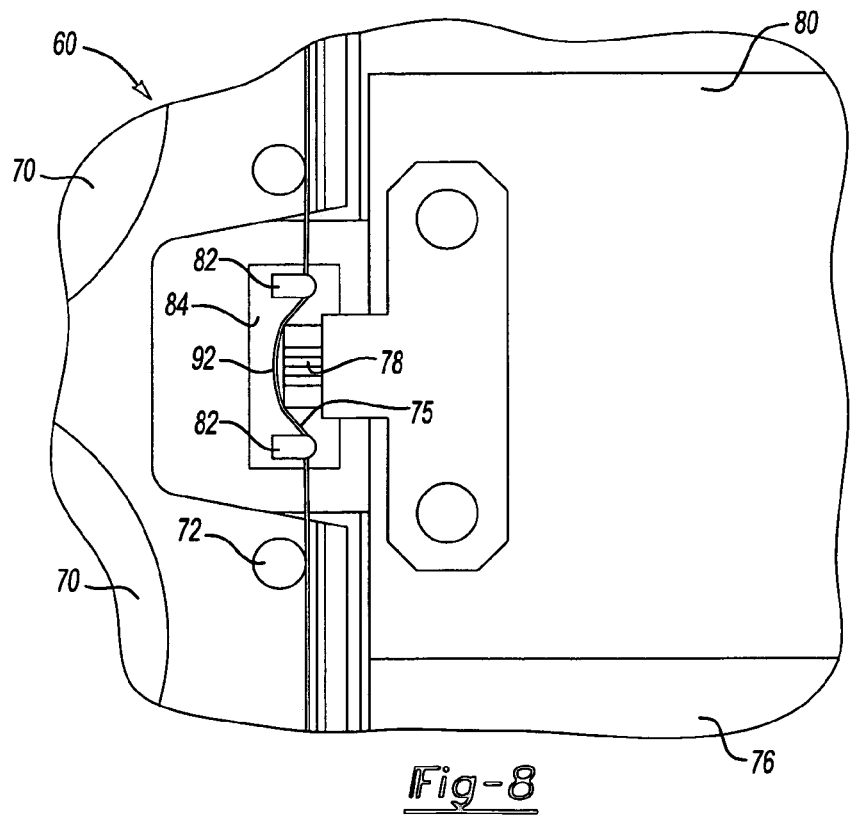
FIG. 8 is a view similar to FIG. 7 but showing the read/write head engaged with the opposite side of the tape from the drive mounted tape guides.

Referring to FIGS. 7 and 8, the movement of the read/write head 78 relative to the tape 75 is shown in two positions. In FIG. 7, the read/write head 78 is shown spaced from the tape 75 with the tape 75 being engaged by the drive guides 82. The drive guides 82 are supported by the drive guide pedestal 84. The read/write head 78 is movably disposed on the tape deck 76 by means of the slide assembly 80.

Referring to FIG. 8, the read/write head 78 is shown in its read/write position wherein the read/write head 78 engages the tape 75 and creates a recessed portion 92 in the tape 75 between the two drive guides 82. In this position, the read/write head 78 is held in closely controlled registry with the tape by the drive guides 82.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A tape system comprising:
a tape drive including a read/write head and at least two drive mounted tape guides, the drive mounted tape guides being spaced apart at a fixed distance from each other, each of the drive mounted tape guides including an upper flange and a lower flange, and the read/write head being moveable toward and away from the drive mounted tape guides;
a tape cartridge including tape, at least two tape reels to receive the tape, at least two cartridge tape guides spaced apart at a fixed distance from each other, and a housing having a side wall and a base wall, the base wall defining a cutout between the cartridge tape guides to receive the drive mounted tape guides, and the side wall defining an access opening to expose a portion of the tape that extends between the cartridge tape guides to the read/write head; and
wherein loading the tape cartridge in the tape drive moves the drive mounted tape guides through the cutout in the base wall to align the drive mounted tape guides and the cartridge tape guides in a linear relationship, locates the tape between the read/write head and the drive mounted tape guides, guides the tape between the upper and lower flanges of the drive mounted tape guides, and provides the read/write head access to engage the tape through the access opening in the side wall of the housing to create a recessed portion in the tape between the drive mounted tape guides, the recessed portion extending generally perpendicular to a plane parallel to a longitudinal axis of the drive mounted tape guides.

2. The tape system of claim 1 wherein the read/write head engages the tape between the drive mounted tape guides to selectively read/write to the tape.

3. The tape system of claim 1 wherein the tape drive includes a slide to selectively move the read/write head in a plane toward and away from the drive mounted tape guides.

4. The tape system of claim 1 wherein the drive mounted tape guides are in fixed alignment with the cartridge tape guides when the tape cartridge is loaded in the tape drive.

5. The tape system of claim 1 wherein the drive mounted tape guides control a lateral position of the portion of the tape that extends between the drive mounted tape guides.

6. The tape system of claim 1 wherein the access opening and the cut out portion open into each other in the housing.

7. The tape system of claim 1 wherein the recessed portion in the tape serves to reduce lateral tape motion and improve data storage efficiency.

8. The tape system of claim 1 wherein the drive mounted tape guides retain the tape in a closely controlled relationship relative to the read/write head when the read/write head engages the tape.

9. The tape system of claim 1 wherein the read/write head is held in controlled registry with the tape when the read/write head engages the tape between the drive mounted tape guides.

10. The tape system of claim 1 wherein the cartridge tape guides and the drive mounted tape guides define a plane parallel to a longitudinal axis of the drive mounted tape guides.

11. The tape system of claim 1 wherein the read/write head, the drive mounted tape guides, and the cartridge tape guides define a plane parallel to a longitudinal axis of the cartridge tape guides when the read/write head engages the tape.

12. The tape system of claim 1 wherein the read/write head define and the drive mounted tape guides define a plane parallel to a longitudinal axis of the drive mounted tape guides when the read/write head engages the tape.

13. A tape drive for receiving a tape cartridge including tape, at least two tape reels to receive the tape, at least two cartridge tape guides spaced apart at a fixed distance from each other, and a housing having a side wall and a base wall, the base wall defining a cutout between the cartridge tape guides and the side wall defining an access opening to expose a portion of the tape that extends between the cartridge tape guides in the tape cartridge, the tape drive comprising:
- at least two drive mounted tape guides spaced apart at a fixed distance from each other, each of the drive mounted tape guides including an upper flange and a lower flange;
- a read/write head being moveable toward and away from the drive mounted tape guides for selectively writing data and reading data from the tape in the tape cartridge; and
- wherein loading the tape cartridge in the tape drive moves the drive mounted tape guides through the cutout in the tape cartridge to align the drive mounted tape guides and the cartridge tape guides in a linear relationship, locates the tape between the read/write head and the drive mounted tape guides, and provides the read/write head access to engage the tape through the access opening in the side wall of the housing to create a recessed portion in the tape between the drive mounted tape guides, the recessed portion extending generally perpendicular to a plane parallel to a longitudinal axis of the drive mounted tape guides.

14. The tape drive of claim 13 wherein the read/write head engages the tape in the tape cartridge between the drive mounted tape guides to selectively read/write data to the tape.

15. The tape drive of claim 13 further comprising a slide to selectively move the read/write head in a plane toward and away from the drive mounted tape guides.

16. The tape drive of claim 13 wherein the drive mounted tape guides control a lateral position of the portion of the tape that extends between the drive mounted tape guides when the tape cartridge is loaded in the tape drive.

17. The tape drive of claim 13 wherein the read/write head intersects a plane parallel to a longitudinal axis of the drive mounted tape guides when the read/write head engages the tape.

18. The tape drive of claim 13 wherein the read/write head define and the drive mounted tape guides define a plane parallel to a longitudinal axis of the drive mounted tape guides when the read/write head engages the tape.

19. A tape drive for receiving a tape cartridge including tape, at least two tape reels to receive the tape, at least two cartridge tape guides spaced apart at a fixed distance from each other, and a housing having a side wall and a base wall, the base wall defining a cutout between the cartridge tape guides and the side wall defining an access opening to expose a portion of the tape that extends between the cartridge tape guides in the tape cartridge, the tape drive comprising:
- at least two drive mounted tape guides spaced apart at a fixed distance from each other and each of the drive mounted tape guides including an upper flange and a lower flange for guiding the tape between the cartridge tape guides;
- a read/write head for selectively writing data and reading data from the tape in the tape cartridge;
- a slide to selectively move the read/write head in a plane toward and away from the drive mounted tape guides;
- wherein loading the tape cartridge in the tape drive moves the drive mounted tape guides through the cutout in the tape cartridge to align the drive mounted tape guides and the cartridge tape guides in a linear relationship, locates the tape between the read/write head and the drive mounted tape guides, and provides the read/write head access to engage the tape in the tape cartridge through the access opening in the tape cartridge to create a recessed portion in the tape between the drive mounted tape guides; and
- wherein the slide moves the read/write head through a plane parallel to a longitudinal axis of the drive mounted tape guides to create the recessed portion in the tape, the recessed portion extending generally perpendicular to a plane parallel to a longitudinal axis of the drive mounted tape guides when the read/write head engages the tape between the drive mounted tape guides.

20. The tape drive of claim 19 wherein the read/write head define and the drive mounted tape guides define a plane parallel to a longitudinal axis of the drive mounted tape guides when the read/write head engages the tape.

* * * * *